US012678364B2

(12) United States Patent
Zhou

(10) Patent No.: US 12,678,364 B2
(45) Date of Patent: Jul. 14, 2026

(54) TELESCOPIC ROTARY MASTURBATION CUP MASSAGER

(71) Applicant: Dongguan Mengma Electronic Technology Co., Ltd., Dongguan (CN)

(72) Inventor: Dongtao Zhou, Dongguan (CN)

(73) Assignee: Dongguan Mengma Electronic Technology Co., Ltd., Dongguan (CN)

( * ) Notice: Subject to any disclaimer, the term of this patent is extended or adjusted under 35 U.S.C. 154(b) by 733 days.

(21) Appl. No.: 18/122,731

(22) Filed: Mar. 17, 2023

(65) Prior Publication Data

US 2023/0210718 A1 Jul. 6, 2023

(30) Foreign Application Priority Data

Sep. 7, 2022 (CN) ........................ 202222380823.4

(51) Int. Cl.
*A61H 19/00* (2006.01)

(52) U.S. Cl.
CPC ..... *A61H 19/32* (2013.01); *A61H 2201/0153* (2013.01); *A61H 2201/1215* (2013.01); *A61H 2201/149* (2013.01); *A61H 2201/1669* (2013.01); *A61H 2201/1671* (2013.01); *A61H 2201/169* (2013.01)

(58) Field of Classification Search
CPC ............ A61H 19/32; A61H 2201/0153; A61H 2201/1215; A61H 2201/149; A61H 2201/1669; A61H 2201/1671; A61H 2201/169; A61H 2201/0192; A61H 2201/1654; A61H 2201/1692
See application file for complete search history.

(56) References Cited

U.S. PATENT DOCUMENTS

| | | | | |
|---|---|---|---|---|
| 2012/0157899 | A1 | 6/2012 | Terada et al. | |
| 2020/0405562 | A1 | 12/2020 | Kodama | |
| 2021/0137775 | A1 | 5/2021 | Kim et al. | |
| 2025/0186299 | A1 * | 6/2025 | Zhou .................... | A61H 9/0057 |

* cited by examiner

*Primary Examiner* — Joel Lamprecht

(57) ABSTRACT

A telescopic rotary masturbation cup massager, comprising a shell and a massaging silica gel member provided in the shell, a drive motor, a rotating member, a sliding member and a transmission gear assembly are provided in the shell, the transmission gear assembly is arranged above the drive motor and engages with the rotating member, a fixing member is sleeved on an outer surface of the rotating member, and a sliding guide rod is provided between the fixing member and the sliding member.

9 Claims, 7 Drawing Sheets

TELESCOPIC ROTARY MASTURBATION CUP MASSAGER

TECHNICAL FIELD

The disclosure pertains to the technical field of health care massagers, and specifically discloses a telescopic rotary masturbation cup massager.

BACKGROUND

With the continuous development and progress of the society and the continuous innovation and upgrading of scientific and technological level, people often face increased pressure while constantly pursuing a higher quality of life. Most people squeeze their own reasonable rest time in exchange for more economic returns, resulting in increasing mental stress, and the body is also constantly under more pressure, which can easily cause the whole person to be overstressed and have a mental breakdown. Therefore, it is necessary to properly release and vent one's own pressure.

When the pressure is too high, people will choose a massager to relieve the pressure. Most males use a vibration massager for massage. At present, most commercially available products use a vibration motor to provide massage and vibration feeling. However, the vibration motor is usually provided at the top of the massager to stimulate and massage the anterior extremity, so that the massager can only provide vibration massage for the top, resulting in a small massage area and failure to provide a comprehensive massage comfort. Therefore, there is a need to improve the product structure so as to provide a more effective pressure release massager.

SUMMARY

In order to overcome the shortcomings and deficiencies of the prior art, the disclosure aims to provide a telescopic rotary masturbation cup massager.

In order to solve the above-mentioned technical problems, the technical scheme adopted by the disclosure is as follows: a telescopic rotary masturbation cup massager, comprises a shell and a massaging silica gel member provided in the shell, a massaging space is formed on the silica gel member, and an inner wall of the massaging space is convexly provided with a plurality of flexible protrusions, a drive motor, a rotating member, a sliding member and a transmission gear assembly are provided in the shell, the transmission gear assembly is arranged above the drive motor and engages with the rotating member, a fixing member is sleeved on an outer surface of the rotating member, a sliding guide rod is provided between the fixing member and the sliding member, the sliding guide rod is arranged above the drive motor, and an outer end face of the sliding member is provided with a sliding connection groove; the sliding guide rod passes through the sliding connection groove so that the sliding member slides and displaces along the sliding guide rod, and the sliding member is arranged above the drive motor, and a through-type mounting channel is respectively provided on the sliding member and the rotating member, and at least one of the mounting channel of the sliding member and the mounting channel of the rotating member fixes the silica gel member.

According to the telescopic rotary masturbation cup massager, the transmission gear assembly comprises a main transmission gear and a secondary transmission gear provided in engagement therewith, the main transmission gear is sleeved on a rotating shaft extending outward from the drive motor and rotates along with the rotating shaft, and the secondary transmission gear also engages with an annular tooth mouth of the rotating member.

According to the telescopic rotary masturbation cup massager, an upper end face of the main transmission gear is provided with a positioning post protruding upward, the positioning post deviates from a center of the main transmission gear, a lower end of the sliding member is longitudinally provided with a sliding groove in fit with the positioning post on the main transmission gear, the sliding groove of the sliding member is sleeved on the positioning post of the main transmission gear, and when the main transmission gear rotates, the positioning post located thereabove rotates therewith, so that the positioning post slides in the sliding groove of the sliding member and the sliding member is driven to slide back and forth along the sliding guide rod.

According to the telescopic rotary masturbation cup massager, the secondary transmission gear is arranged below the rotating member, the main transmission gear rotates to drive the secondary transmission gear to rotate, and the rotating member rotates by engaging with the secondary transmission gear through the annular tooth mouth.

According to the telescopic rotary masturbation cup massager of the claims, the shell comprises side shells assembled at both sides and an annular end cover provided at front ends of the side shells for stabilization, an inner end face of one side shell is provided with a plurality of mounting guide posts for stable positioning, mounting posts positionally corresponding to the mounting guide posts are provided on the other side shell for covering connection, an inner end face of the annular end cover is further provided with a plurality of fixing hooks protruding forward and a sliding rod mounting post for positioning and mounting the sliding guide rod, the annular end cover is sleeved at the front ends of the assembled side shells and extends into inner ends of the side shells through the fixing hooks to hook side walls for stable connection.

According to the telescopic rotary masturbation cup massager, a hand-held portion is further provided on the shell, and a stabilizing groove is provided in the hand-held portion for accommodating the drive motor.

According to the telescopic rotary masturbation cup massager of the claims, a positioning groove is respectively provided on inner side walls of the side shells for stably positioning the fixing member, positioning blocks positionally corresponding to the positioning grooves are provided on an outer surface of the fixing member, and the positioning blocks are symmetrically arranged at both side ends of the fixing member.

According to the telescopic rotary masturbation cup massager, fixing shoulders corresponding to the mounting guide posts of the side shells are further provided at an upper end of the outer surface of the fixing member, through holes for the mounting posts of the side shells to pass through are provided on the fixing shoulders, a sliding rod fixing post is provided at an outer lower end of the fixing member, a first fixing end of the sliding guide rod is connected with the sliding rod fixing post, and the sliding rod fixing post is arranged on a lower outer end face of the fixing member and positionally corresponds to the sliding rod mounting post on the annular end cover, and a second fixing end of the sliding guide rod passes through the sliding connection groove and is then connected with the sliding rod mounting post on the annular end cover.

According to the telescopic rotary masturbation cup massager, a lithium battery for supplying electric energy is further provided in the shell, and the lithium battery is electrically connected with the drive motor for supplying the electric energy and rotating the drive motor.

The disclosure achieves the following beneficial effects: the telescopic rotary masturbation cup massager is simple in structure and convenient to use, the rotating member and the sliding member are provided in the shell, and the transmission gear assembly is driven by the drive motor to rotate the rotating member and the sliding member, the secondary transmission gear is engaged to rotate the rotating member having the annular tooth mouth, and the positioning post is arranged on the main transmission gear, and the sliding member is driven to reciprocate back and forth along the sliding guide rod when the main transmission gear rotates; the massage silica gel member is mounted on the rotating member and the sliding member and can provide a comprehensive massage stimulation through fit between the rotating member and the sliding member; and the hand-held portion is provided on the shell to facilitate grasping and use by a user, thus satisfying different usage conditions.

EXPLANATION OF REFERENCE NUMERALS IN THE DRAWINGS

10. shell; 11. side shell; 111. positioning groove; 12. annular end cover; 13. mounting guide post; 14. mounting post; 15. fixing hook; 16. Sliding rod mounting post; 17. hand-held portion; 171. stabilizing groove; 20. drive motor; 30. rotating member; 31. annular tooth mouth; 40. sliding member; 41. sliding connection groove; 42. sliding groove; 50. transmission gear assembly; 51 main transmission gear; 52. secondary transmission gear; 53. positioning post; 60. fixing member; 61. positioning block; 62. fixing shoulder; 63. sliding rod fixing post; 70. sliding guide rod; 80. lithium battery.

DESCRIPTION OF THE EMBODIMENTS

In order to facilitate understanding by those skilled in the art, the disclosure is further described with reference to the following embodiments and accompanying drawings, and references to the embodiments are not intended to limit the disclosure.

Figure 1:
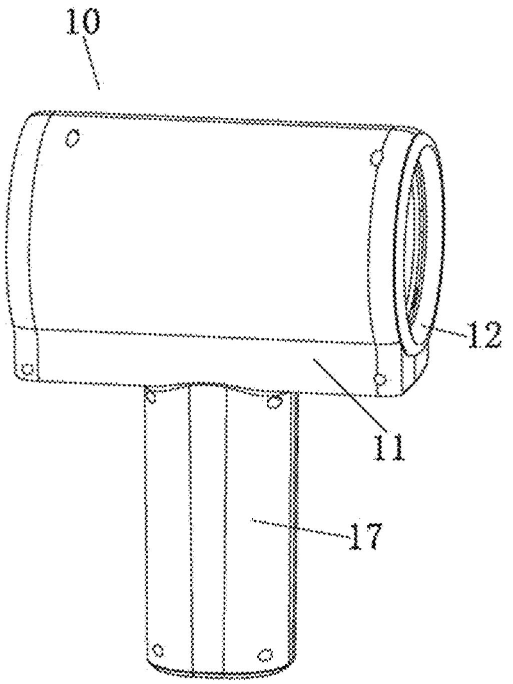
FIG. 1 is a schematic view of an overall structure of the disclosure.
Figure 2:
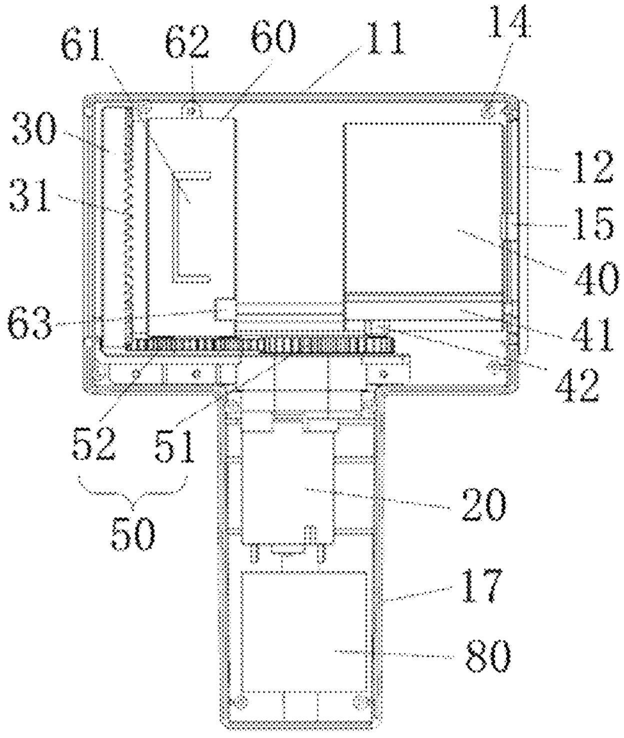
FIG. 2 is a schematic view (I) of an internal structure of the disclosure.
Figure 3:
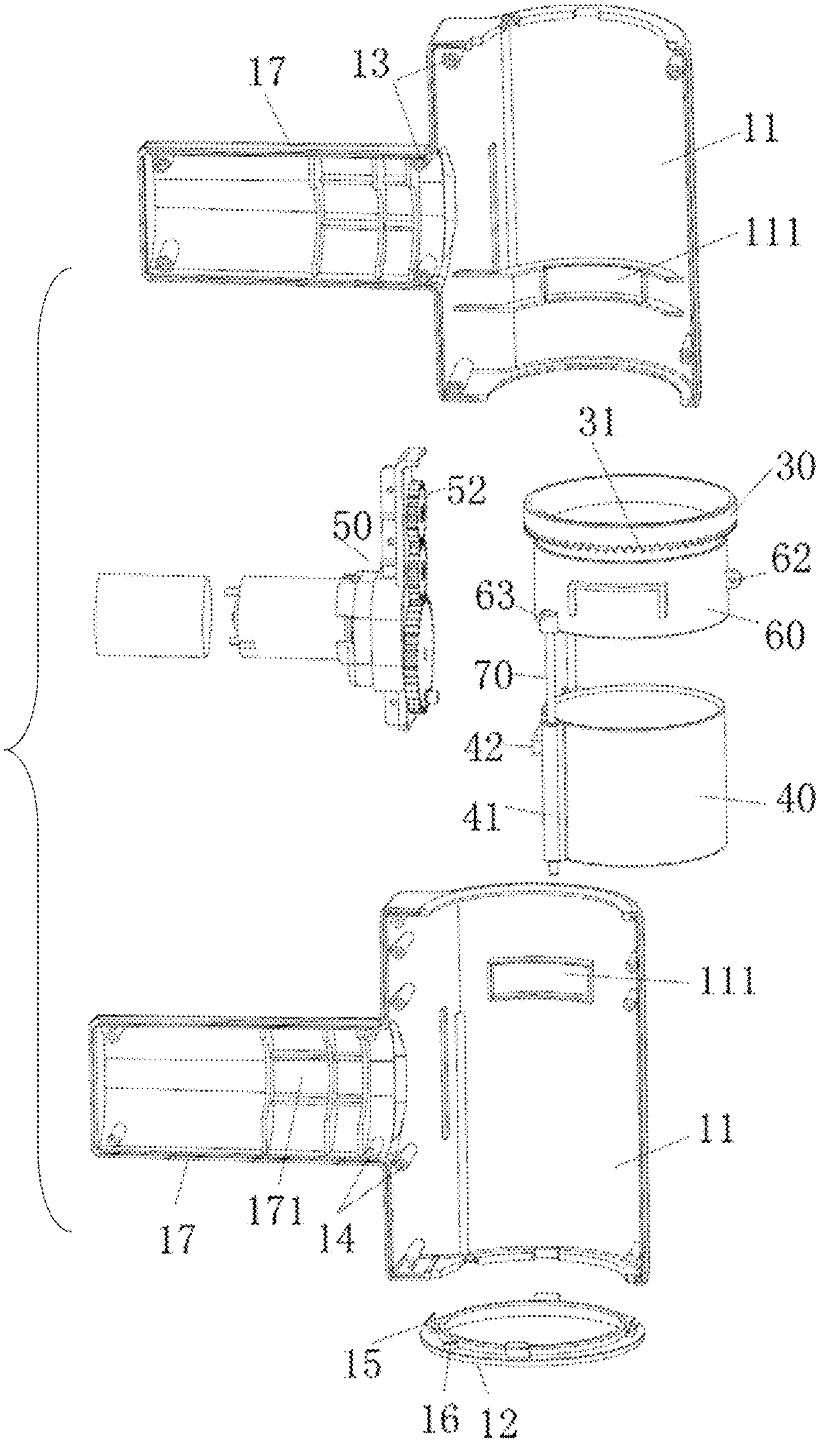
FIG. 3 is a schematic view (I) of an exploded structure of the disclosure.
Figure 4:
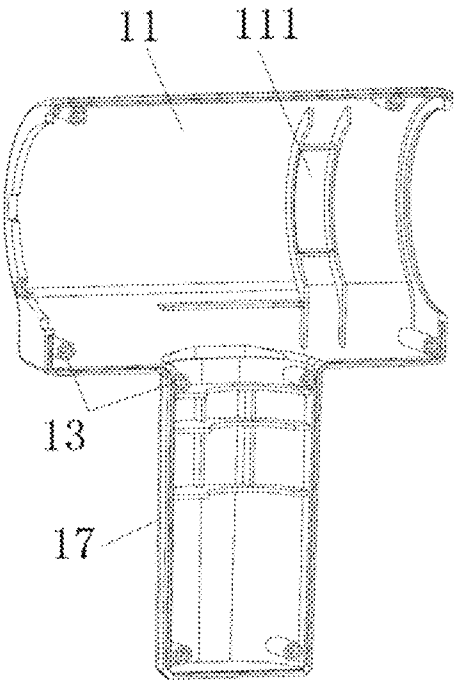
FIG. 4 is a schematic view (I) of a side shell structure of the disclosure.
Figure 5:
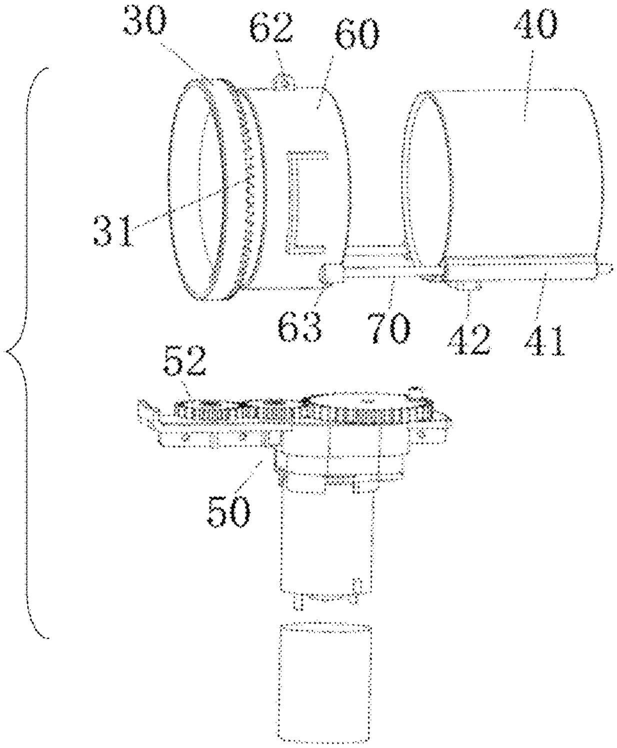
FIG. 5 is a schematic view (II) of the exploded structure of the disclosure.
Figure 6:
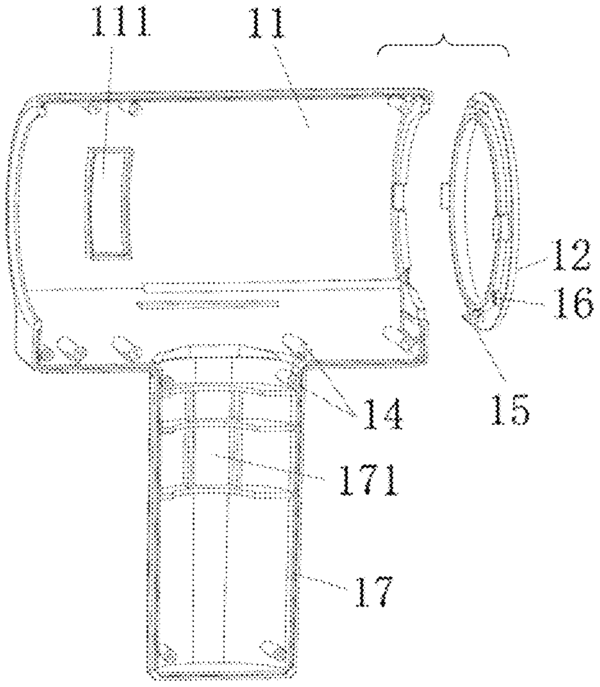
FIG. 6 is a schematic view (II) of the side shell structure of the disclosure.
Figure 7:
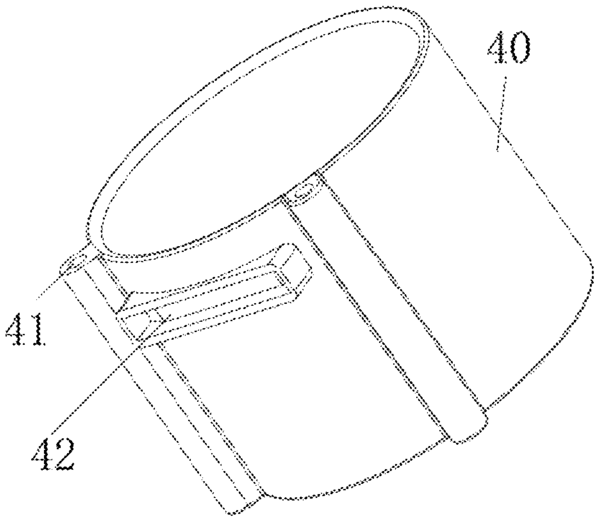
FIG. 7 is a schematic view of a sliding member of the disclosure.
Figure 8:
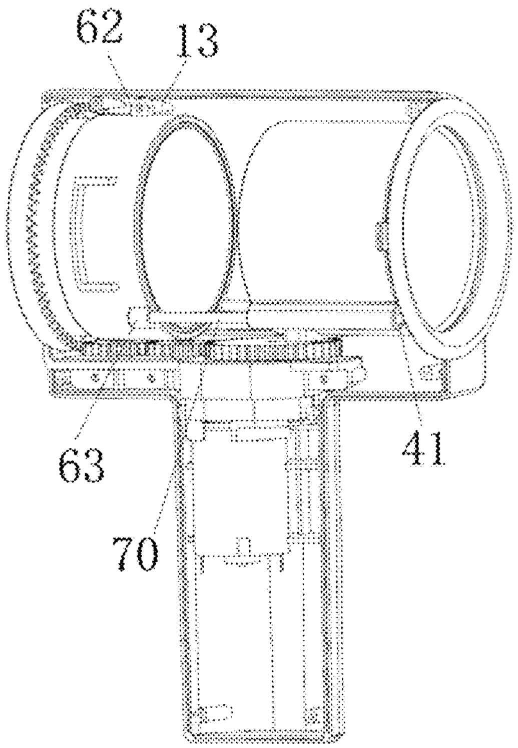
FIG. 8 is a schematic view (II) of the internal structure of the disclosure.
Figure 9:
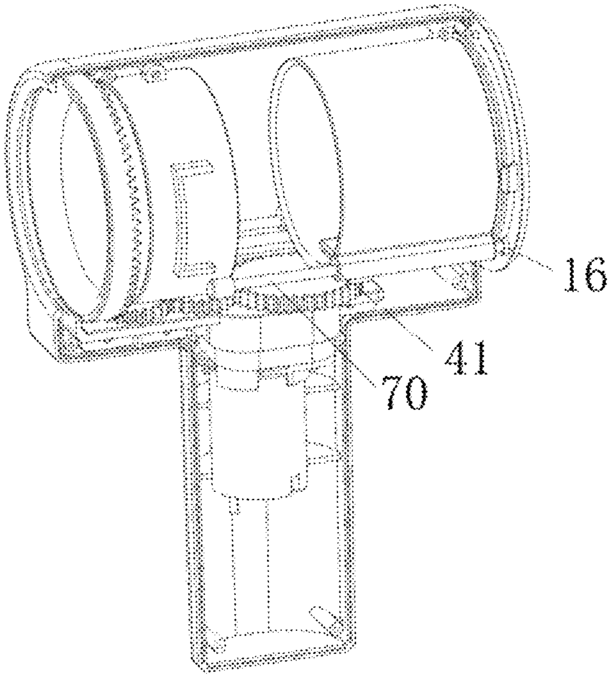
FIG. 9 is a schematic view (III) of the internal structure of the disclosure.
Figure 10:
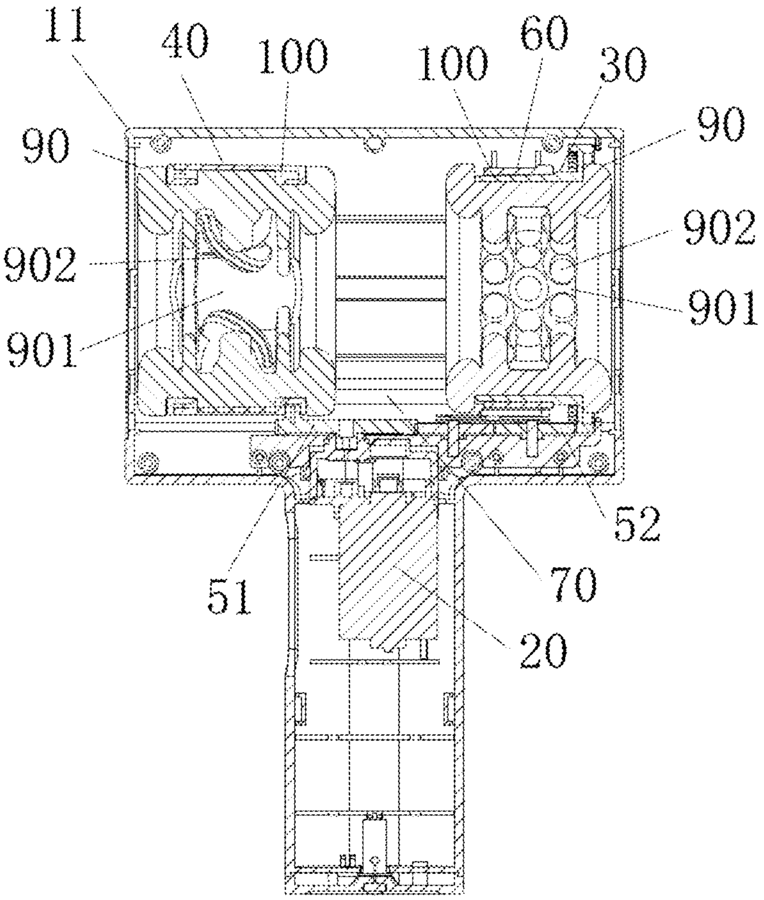
FIG. 10 is a schematic cross-sectional view of the disclosure.
Figure 11:
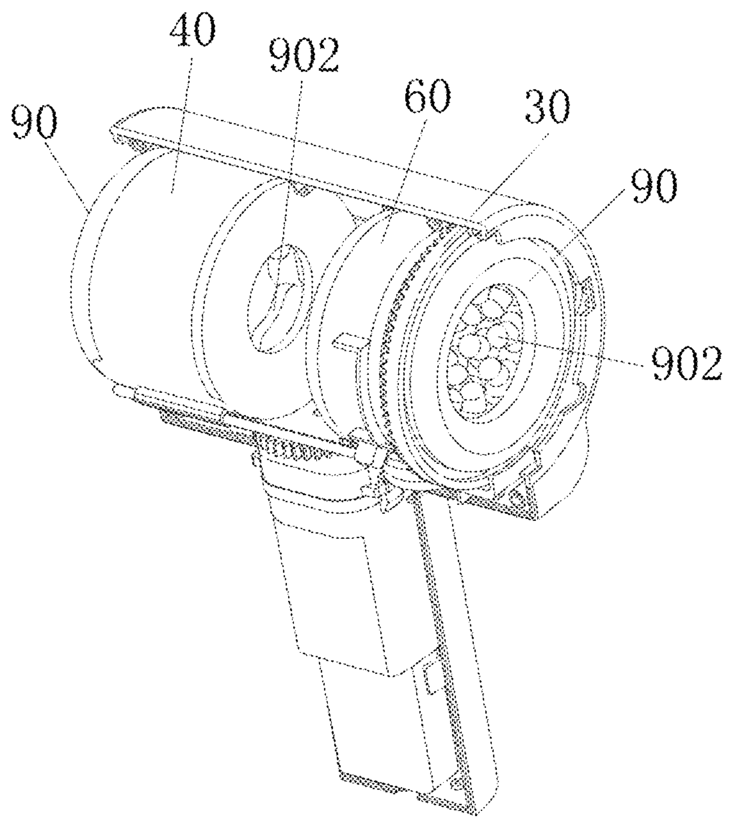
FIG. 11 is a schematic view (IV) of the internal structure of the disclosure.

As shown in FIGS. 1-3, a telescopic rotary masturbation cup massager comprises a shell 10 and a massaging silica gel member 90 provided in the shell 10, a massaging space 901 is formed on the silica gel member 90, and an inner wall of the massaging space 901 is convexly provided with a plurality of flexible protrusions 902; a drive motor 20, a rotating member 30, a sliding member 40 and a transmission gear assembly 50 are provided in the shell 10, the transmission gear assembly 50 is arranged above the drive motor 20 and is engaged with the rotating member 30, and a fixing member 60 is sleeved on an outer surface of the rotating member 30; a sliding guide rod 70 is further provided between the fixing member 60 and the sliding member 40 for arranging the sliding member 40 above for sliding displacement, and a sliding connection groove 41 is provided on an outer end face of the sliding member 40 for the sliding guide rod 70 to pass through, that is, during use, the drive motor 20 is turned on to drive the transmission gear assembly 50 located above to rotate, and the rotating member 30 is driven by the transmission gear assembly 50 to rotate, and then the sliding member 40 is driven by the transmission gear assembly 50 to reciprocate along the sliding guide rod 70; and the massaging silica gel member mounted inside can be continuously rotated and reciprocated back and forth by the fit between the sliding member and the rotating member so as to provide a massage stimulation effect in a wide range and increase massage comfort for better pressure release; the rotating member 30, the fixing member 60 and the sliding member 40 are all sleeve structures, and a through-type mounting channel 100 is respectively provided on the sliding member 40 and the rotating member 30; at least one of the mounting channel 100 of the sliding member 40 and the mounting channel 100 of the rotating member 30 fixes the silica gel member 90; and the flexible protrusions on the sliding member 40 is sheet-like flexible protrusions, and the flexible protrusions on the rotating member 30 are cylindrical flexible protrusions.

In the present embodiment, the transmission gear assembly 50 comprises a main transmission gear 51 and a secondary transmission gear 52 provided in engagement therewith, the main transmission gear 51 is sleeved on a rotating shaft extending outward from the drive motor 20, so that the main transmission gear 51 can rotate with the operation of the drive motor 20, and an upper end face of the main transmission gear 51 is provided with a positioning post 53 protruding upward; the positioning post 53 is arranged at a lower end of the sliding member 40 and the sliding member 40 is controlled by the positioning post, so that the sliding member 40 can slide and displace back and forth along the sliding guide rod 70; and in use, the positioning post 53 arranged above the main transmission gear 51 circumferentially rotate with the main transmission gear 51, so that the positioning post 53 drives the sliding member 40 to reciprocate along the sliding guide rod 70.

In the present embodiment, the lower end of the sliding member 40 is longitudinally provided with a sliding groove 42 in fit with the positioning post 53 on the main transmission gear 51; in practical use, the sliding groove 42 of the sliding member 40 is sleeved on the positioning post 53 of the main transmission gear 51, and when the main transmission gear 51 rotates, the positioning post 53 located thereabove rotates therewith, so that the positioning post 53 transversely moves back and forth in the sliding groove 42 of the sliding member 40, and the sliding groove 42 is driven by the positioning post 53 so that the sliding member 40 can positionally slide back and forth along the sliding guide rod 70 to realize reciprocating motion of the sliding member 40.

In practical use, the secondary transmission gear 52 is arranged below the rotating member 30 and is engaged with the rotating member 30, and an annular tooth mouth 31 is provided on the rotating member 30 and is engaged with a tooth mouth of the secondary transmission gear 52; and in use, the main transmission gear 51 rotates to drive the secondary transmission gear 52 to rotate, and then the secondary transmission gear 52 drives the rotating member 30 with the annular tooth mouth 31 to rotate, so that the rotating member 30 rotates back and forth in the fixing member 60.

In practical use, the shell 10 comprises side shells 11 assembled at both sides and an annular end cover 12 provided at front ends of the side shells 11 for stabilization, an inner end face of one side shell 11 is provided with a plurality of mounting guide posts 13 for stable positioning, mounting posts 14 positionally corresponding to the mounting guide posts 13 are provided on the other side shell 11 for covering connection, and then the two side shells 11 are connected and fixed together by driving fixing screws from outer ends. Then, an inner end face of the annular end cover 12 is further provided with a plurality of fixing hooks 15 protruding forward and a sliding rod mounting post 16 for positioning and mounting the sliding guide rod 70, after the side shells 11 at two sides are assembled, the annular end cover 12 is sleeved on the front ends of the assembled side shells 11, and then the fixing hooks 15 extend into the inner ends of the side shells 11 and hook side walls of the side shells 11 for stable connection, effectively preventing unstable connection and loosening.

In practical use, a hand-held portion 17 is further provided on the shell 10, the hand-held portion 17 is formed by assembling the two side shells 11 so as to facilitate a user to grasp the hand-held portion during use, a stabilizing groove 171 for accommodating the drive motor 20 is provided in the hand-held portion 17, and a lithium battery 80 for supplying electric energy is further provided in the shell 10. The lithium battery 80 is arranged at a lower end position of the hand-held portion 17 and is electrically connected with the drive motor 20, so that the lithium battery 80 supplies the electric energy to the drive motor 20 to realize operation.

In the present embodiment, a positioning groove 111 for stably positioning the fixing member 60 is further provided on the inner side walls of the side shells 11 respectively, positioning blocks 61 positionally corresponding to the positioning grooves 111 of the side shells 11 are provided on an outer surface of the fixing member, and the positioning blocks 61 are symmetrically arranged at both side ends of the fixing member, so that the fixing member 60 can be quickly and accurately placed on the side shells 11 for mounting. In addition, fixing shoulders 62 corresponding to the mounting guide posts 13 of the side shells 11 are further provided at an upper end of the outer surface of the fixing member, and through holes for the mounting posts 14 of the side shells 11 to pass through are provided on the fixing shoulders 62, so that when the fixing member 60 is mounted, the connection can be further stabilized by the fixing shoulders 62, and a sliding rod fixing post 63 is provided at an outer lower end of the fixing member for fixedly placing the sliding guide rod 70 therein. The sliding rod fixing post 63 is arranged on a lower outer end face of the fixing member and positionally corresponds to the sliding rod mounting post 16 on the annular end cover 12, so that the sliding guide rod 70 can be quickly and accurately sleeved and fixed.

The disclosure has been described with reference to the above preferred embodiments. However, the technical scope of the disclosure is not limited to the preferred embodiments described above, and any minor alterations, equivalent changes and modifications made to the above embodiments according to the technical spirits of the disclosure shall fall within the scope of the disclosure.

What is claimed is:

1. A telescopic rotary masturbation cup massager, comprising a shell and a massaging silica gel member provided in the shell, a massaging space being formed on the silica gel member, and an inner wall of the massaging space being convexly provided with a plurality of flexible protrusions, wherein: a drive motor, a rotating member, a sliding member and a transmission gear assembly are provided in the shell, the transmission gear assembly is arranged above the drive motor and engages with the rotating member, a fixing member is sleeved on an outer surface of the rotating member, a sliding guide rod is provided between the fixing member and the sliding member, the sliding guide rod is arranged above the drive motor, and an outer end face of the sliding member is provided with a sliding connection groove; the sliding guide rod passes through the sliding connection groove so that the sliding member slides and displaces along the sliding guide rod, and the sliding member is arranged above the drive motor, and a through-type mounting channel is respectively provided on the sliding member and the rotating member, and at least one of the mounting channel of the sliding member and the mounting channel of the rotating member fixes the silica gel member.

2. The telescopic rotary masturbation cup massager according to claim 1, wherein: the transmission gear assembly comprises a main transmission gear and a secondary transmission gear provided in engagement therewith, the main transmission gear is sleeved on a rotating shaft extending outward from the drive motor and rotates along with the rotating shaft, and the secondary transmission gear also engages with an annular tooth mouth of the rotating member.

3. The telescopic rotary masturbation cup massager according to claim 2, wherein: an upper end face of the main transmission gear is provided with a positioning post protruding upward, the positioning post deviates from a center of the main transmission gear, a lower end of the sliding member is longitudinally provided with a sliding groove in fit with the positioning post on the main transmission gear, the sliding groove of the sliding member is sleeved on the positioning post of the main transmission gear, and when the main transmission gear rotates, the positioning post located thereabove rotates therewith, so that the positioning post slides in the sliding groove of the sliding member and the sliding member is driven to slide back and forth along the sliding guide rod.

4. The telescopic rotary masturbation cup massager according to claim 2, wherein: the secondary transmission gear is arranged below the rotating member, the main transmission gear rotates to drive the secondary transmission gear to rotate, and the rotating member rotates by engaging with the secondary transmission gear through the annular tooth mouth.

5. The telescopic rotary masturbation cup massager according to claim 1, wherein: the shell comprises side shells assembled at both sides and an annular end cover provided at front ends of the side shells for stabilization, an inner end face of one side shell is provided with a plurality of mounting guide posts for stable positioning, mounting posts positionally corresponding to the mounting guide posts are provided on the other side shell for covering connection, an inner end face of the annular end cover is further provided with a plurality of fixing hooks protruding forward and a sliding rod mounting post for positioning and mounting the sliding guide rod, the annular end cover is sleeved at the front ends of the assembled side shells and extends into inner ends of the side shells through the fixing hooks to hook side walls for stable connection.

6. The telescopic rotary masturbation cup massager according to claim 5, wherein: a hand-held portion is further provided on the shell, and a stabilizing groove is provided in the hand-held portion for accommodating the drive motor.

7. The telescopic rotary masturbation cup massager according to claim 5, wherein: a positioning groove is respectively provided on inner side walls of the side shells for stably positioning the fixing member, positioning blocks positionally corresponding to the positioning grooves are provided on an outer surface of the fixing member, and the positioning blocks are symmetrically arranged at both side ends of the fixing member.

8. The telescopic rotary masturbation cup massager according to claim 7, wherein: fixing shoulders corresponding to the mounting guide posts of the side shells are further provided at an upper end of the outer surface of the fixing member, through holes for the mounting posts of the side shells to pass through are provided on the fixing shoulders, a sliding rod fixing posts is provided at an outer lower end of the fixing member, a first fixing end of the sliding guide rod is connected with the sliding rod fixing post, and the sliding rod fixing post is arranged on a lower outer end face of the fixing member and positionally corresponds to the sliding rod mounting post on the annular end cover, and a second fixing end of the sliding guide rod passes through the sliding connection groove and is then connected with the sliding rod mounting post on the annular end cover.

9. The telescopic rotary masturbation cup massager according to claim 1, wherein: a lithium battery for supplying electric energy is further provided in the shell, and the lithium battery is electrically connected with the drive motor for supplying the electric energy and rotating the drive motor.

* * * * *